United States Patent
Kobayashi

(10) Patent No.: US 7,885,628 B2
(45) Date of Patent: Feb. 8, 2011

(54) FM TUNER

(75) Inventor: Keiji Kobayashi, Kawanishi (JP)

(73) Assignees: Sanyo Electric Co., Ltd., Moriguchi-shi (JP); Sanyo Semiconductor Co., Ltd., Ora-gun (JP)

( * ) Notice: Subject to any disclaimer, the term of this patent is extended or adjusted under 35 U.S.C. 154(b) by 427 days.

(21) Appl. No.: 12/222,023

(22) Filed: Jul. 31, 2008

(65) Prior Publication Data
US 2009/0036085 A1    Feb. 5, 2009

(30) Foreign Application Priority Data
Aug. 3, 2007    (JP)    ............................. 2007-202707

(51) Int. Cl.
H04B 1/10    (2006.01)
(52) U.S. Cl. .................. 455/296; 455/570; 455/214; 455/501; 381/13; 375/308
(58) Field of Classification Search .................. 455/296, 455/570, 214, 501, 63.1, 67.13, 77, 120, 455/125, 178.1, 114.2; 381/13, 11, 10; 375/308, 375/317
See application file for complete search history.

(56) References Cited

U.S. PATENT DOCUMENTS

| | | | | |
|---|---|---|---|---|
| 3,662,113 | A | * | 5/1972 | Von Recklinghausen ....... 381/8 |
| 4,216,353 | A | * | 8/1980 | Fish, Jr. ........................ 381/10 |
| 4,379,207 | A | | 4/1983 | Kubota ........................ 455/205 |
| 4,416,024 | A | * | 11/1983 | Ugari et al. .................. 455/303 |
| 4,881,274 | A | * | 11/1989 | Tazaki et al. .................. 455/296 |
| 5,113,446 | A | * | 5/1992 | Kennedy ....................... 381/10 |
| 5,202,924 | A | * | 4/1993 | Richards, Jr. ................. 381/13 |
| 5,204,904 | A | * | 4/1993 | Carver et al. .................. 381/13 |
| 5,249,233 | A | * | 9/1993 | Kennedy et al. .............. 381/13 |
| 5,493,717 | A | | 2/1996 | Schwarz |
| 5,661,809 | A | * | 8/1997 | Chahabadi et al. ............ 381/13 |
| 5,696,830 | A | * | 12/1997 | Chahabadi et al. ............. 381/4 |
| 5,701,345 | A | * | 12/1997 | Howlett et al. ................ 381/13 |
| 5,784,465 | A | * | 7/1998 | Fujiwara ...................... 381/10 |

(Continued)

FOREIGN PATENT DOCUMENTS

EP    0 629 053 A1    12/1994

(Continued)

OTHER PUBLICATIONS

European Search Report issued Dec. 10, 2009 in European Patent Application No. 08161574.2.

*Primary Examiner*—Minh D Dao
(74) *Attorney, Agent, or Firm*—Oliff & Berridge, PLC

(57) ABSTRACT

An FM tuner that has a multipath reception detection unit and an adjacent-channel interference detection unit while reducing expansion of the scale of the circuit is available. A control signal for a stereo separation level is generated on the basis of a signal $S_{M-DC}$ corresponding to a reception field strength and of a signal $S_{MP}$ corresponding to a multipath noise component. The $S_{MP}$ is extracted from a fluctuation component signal $S_{M-AC}$ from an S-meter circuit 92 by a multipath noise extraction circuit 104. The multipath noise extraction circuit 104 used for control of the stereo separation level is shared as a portion of the circuitry for detecting the multipath signal reception state. A multipath reception detection unit 108 compares the $S_{MP}$ with a threshold value to detect a multipath reception state.

4 Claims, 3 Drawing Sheets

U.S. PATENT DOCUMENTS

| | | | |
|---|---|---|---|
| 6,064,865 A | 5/2000 | Kuo et al. | |
| 6,173,166 B1* | 1/2001 | Whitecar | 455/296 |
| 6,295,324 B1* | 9/2001 | Whikehart | 375/308 |
| 6,658,116 B1* | 12/2003 | Rychlak | 381/11 |
| 6,665,526 B2* | 12/2003 | Tsuji et al. | 455/296 |
| 2005/0020220 A1 | 1/2005 | Gamou | |
| 2009/0061801 A1* | 3/2009 | Kobayashi | 455/150.1 |
| 2009/0111410 A1* | 4/2009 | Kobayashi | 455/214 |

FOREIGN PATENT DOCUMENTS

| | | |
|---|---|---|
| JP | A-2003-152573 | 5/2003 |
| WO | WO 2007/086174 A1 | 8/2007 |

* cited by examiner

FM TUNER

CROSS-REFERENCE TO RELATED APPLICATION

The priority application number JP2007-202707 upon which this patent application is based is hereby incorporated by reference.

BACKGROUND OF THE INVENTION

1. Field of the Invention

The present invention relates to an FM (frequency modulation) tuner for receiving frequency-modulated signals.

2. Description of the Related Art

The quality of audio output reproduced by an FM tuner deteriorates in a multipath reception (multipath interference state), in which direct waves from a radio broadcast station and reflected waves from buildings and the like along the transmission path are received. An FM signal necessitates a broader frequency band for transmission than an AM signal, for example, in order to change the frequency of the carrier wave on the basis of audio signals, and the like. Accordingly, in a case in which a transmission signal having a target frequency is received by an FM tuner, the receiver is susceptible to interference (adjacent-channel interference) from other signals transmitted at frequencies close to the target frequency. This phenomenon can have adverse effects on the quality of detected audio signals. Multipath interference and adjacent-channel interference are also not desirable for RDS (Radio Data System), in which text data, and the like, are overlaid with the FM radio broadcast signal.

FIG. 3 is a block diagram describing the configuration of a conventional FM tuner. An RF (Radio Frequency) signal received by an antenna 2 is frequency converted to a first intermediate signal $S_{IF1}$ having a first intermediate frequency (IF) $f_{IF1}$, and the $S_{IF1}$ is frequency converted to a second intermediate signal $S_{IF2}$ having a second intermediate frequency $f_{IF2}$. The $S_{IF2}$ is input to an IFBPF 4. The IFBPF 4 is a bandpass filter with an $f_{IF2}$ as a center frequency. The bandwidth $W_F$ is configured to be variable within a range of about 40 kHz to about 220 kHz, for example.

An FM signal that has passed through the IFBPF 4 is supplied to a limiter amp 6. The limiter amp 6 increases the amplitude of the FM signal to create a rectangular wave, and removes noise overlaid onto the FM signal. The FM signal that has been amplified and rendered into a rectangular wave is input to an FM detection circuit 8. The FM detection circuit 8 FM-detects an output signal of the limiter amp 6, and outputs a detection signal $S_{DET}$.

A matrix circuit 10 extracts a sum signal (L+R) and a difference signal (L−R) of the left and right audio signals (L signal and R signal) from $S_{DET}$, which is a stereo composite signal, and separates and outputs the L signal from the R signal in accordance with a matrix scheme.

An S-meter circuit 12 generates an $S_{IF1}$-containing amplitude variation component signal $S_{M-AC}$ on the basis of the first intermediate signal $S_{IF1}$, for example, and also smoothes the variation component using a low-pass filter (LPF) and generates a reception field strength signal $S_{M-DC}$. Included in the variation component signal $S_{M-AC}$ is a component that corresponds to adjacent-channel interference and multipath interference.

A high-pass filter (HPF) 14, a detection circuit 16, and a comparison circuit 18 are provided as circuits for detecting the presence or absence of adjacent-channel interference and multipath interference on the basis of $S_{M-AC}$. The HPF 14 is capable of switching the cutoff frequency $f_c$ according to whether one or the other of a frequency band component corresponding to adjacent-channel interference or a frequency band component corresponding to multipath interference is extracted. For example, when a component corresponding to adjacent-channel interference is extracted from $S_{M-AC}$, $f_c$ is set to about 100 kHz. When a component corresponding to multipath interference is extracted from $S_{M-AC}$, $f_c$ is set to about 50 kHz. The detection circuit 16 performs rectifying detection on a high-frequency component that has passed through the HPF 14, and the component is converted to a DC voltage $V_{SQ}$. The comparison circuit 18 compares an output level $V_{SQ}$ of the detection circuit 16 with a reference voltage $V_{REF}$ set to a predetermined threshold value. For example, if $V_{SQ} > V_{REF}$, a predetermined voltage $V_H$ (H level) corresponding to a logical value of "1" is output as an SQ sensor signal $S_{SQ}$ indicating a determination result that either adjacent-channel interference or multipath interference has occurred. However, if $V_{SQ} \leq V_{REF}$, a predetermined voltage $V_L$ (L level, $V_L < V_H$) corresponding to a logical value of "0" is output as $S_{SQ}$ indicating a determination result that neither adjacent-channel interference nor multipath interference has occurred. In an FM tuner supporting RDS, an AF search is performed that automatically selects a broadcast station with favorable reception conditions, and $S_{SQ}$, for example, is utilized in assessment of reception conditions at the time of automatic channel selection.

Also, the $V_{SQ}$ corresponding to an adjacent-channel interference component output from the detection circuit 16 is input to a bandwidth control circuit 20 for controlling the bandwidth $W_F$ of the IFBPF 4. The bandwidth control circuit 20 narrows the $W_F$ in instances in which adjacent-channel interference has occurred, and reduces the effect of adjacent-channel interference on the output audio signal. Here, the $V_{SQ}$ is smoothed using a predetermined time constant in order to suppress the effect on the output audio signal from frequent narrowing and expansion of the $W_F$. A time constant of about 2 mS (millisecond) can be provided, for example.

The degree of separation of a stereo signal generated by the matrix circuit 10 is controlled by a stereo separation level control circuit 22. The stereo separation level circuit 22 adjusts the relative strength of the difference signal (L−R) in relation to the sum signal (L+R) through a matrix process performed by the matrix circuit 10.

For example, when a weak field is present, the separation level is reduced in order to lower the noise offensive to the ear in stereo audio, and reproduction is performed as monaural audio. The separation level is also reduced when multipath interference is present in order to reduce the effects from multipath noise on the (L−R) signal. The control input to the stereo separation level control circuit 22 in order to perform the control is generated by a control input generation circuit 24 on the basis of the sensor signal $S_{M-DC}$ for reception field strength and the sensor signal $S_{M-AC}$ for multipath interference.

An HPF 26 and a detection circuit 28 are provided as circuits for extracting a component corresponding to multipath interference from $S_{M-AC}$ for the purpose of stereo separation level control. The HPF 26 extracts a component of the frequency band corresponding to multipath interference from the $S_{M-AC}$ and outputs the component to the detection circuit 28. The detection circuit 28 performs rectifying detection on the high-frequency component that has passed through the HPF 26, converts the result to a DC voltage $V_{MP}$, and outputs the result to the control input generation circuit 24. The control input generation circuit 24 attenuates the $S_{M-DC}$ in accordance with the $V_{MP}$. As a result, the weaker receiving electric field, the lower output voltage of the control input generation circuit 24; also, the smaller fluctuation component derived from the multipath interference, the lower output voltage. In addition, the stereo separation level control circuit 22 lowers the separation level in instances in which the output voltage of the control input generation circuit 24 is low, and raises the separation level in instances when the voltage is high. It is accordingly possible to reduce the sense of auditory discomfort from noise at times of weak field and from multipath interference.

During RDS receiving status, if reception conditions deteriorate, an AF search is performed, and a broadcast station with favorable reception conditions is automatically selected. It is preferred that the AF search be performed as quickly as possible in order to shorten the time interval during which reception is interrupted. The AF search needs to be completed within at least several millisecond.

However, if the SQ sensor signal $S_{SQ}$ discussed above is used for the AF search, respective detection results for adjacent-channel interference and multipath interference cannot be obtained simultaneously. Accordingly, a problem has arisen in terms of the difficulty with which a quicker AF search is performed. Shortening the AF search time has been particularly difficult in instances in which the above-mentioned time constant is applied to the $V_{SQ}$ for the purpose of $W_F$ control.

SUMMARY OF THE INVENTION

In order to solve the problems described above, it is an object of the present invention to provide an FM tuner allowing the AF search speed to be increased and the detection time of an alternative station to be decreased.

The FM tuner according to the present invention has a stereo separation level control unit for controlling the stereo separation level of a stereo audio signal detected from an FM received signal; a multipath noise component extraction unit for extracting a noise component based on multipath reception from an amplitude fluctuation component present in the FM received signal; a control input generation unit for generating a control input signal to the stereo separation level control unit on the basis of the noise component; a multipath reception detection unit for detecting the multipath reception on the basis of the level of the noise component; and an adjacent-channel interference detection unit for detecting interference from an adjacent signal to a reception target station on the basis of the amplitude fluctuation component, in parallel with detection of the multipath reception by the multipath reception detection unit.

DESCRIPTION OF THE PREFERRED EMBODIMENTS

Figure 1:
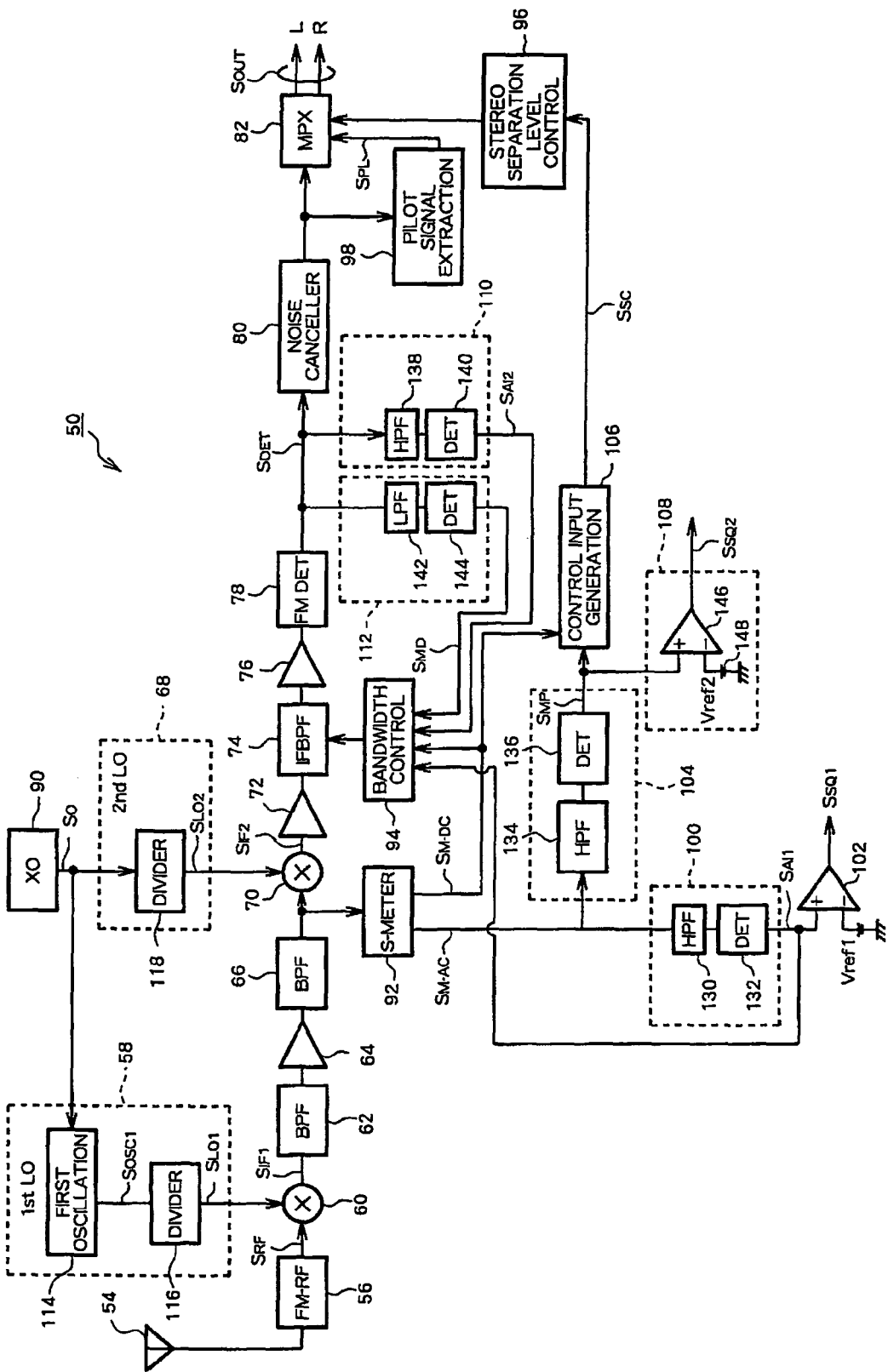
FIG. 1 is a general block diagram of the FM tuner according to an embodiment of the present invention.

The following section describes a preferred embodiment (referred to hereafter simply as "embodiment") of the present invention on the basis of the accompanying drawings. FIG. 1 is a general block diagram of the FM tuner according to the present embodiment. An FM tuner 50 is formed on a common circuit board while having all main components designed as integrated circuits, and is essentially configured as an integrated tuner module.

The module is incorporated as one component of a car audio device in an automotive vehicle, for example. An RF signal $S_{RF}$ received by an antenna 54 is processed in the FM tuner 50 by a signal processing system including an FM-RF tuned amplifier circuit 56, a first local oscillator unit 58, a first mixing circuit 60, bandpass filters (BPF) 62, 66, buffer amps 64, 72, a second local oscillator unit 68, a second mixing circuit 70, an IFBPF 74, a limiter amp 76, an FM detection circuit 78, a noise canceller 80, and a matrix circuit (MPX circuit) 82. An output signal $S_{OUT}$ corresponding to the audio signal of the desired station is generated.

In addition to the structural elements described above, the FM tuner 50 includes a crystal oscillation circuit 90, an S-meter 92, a bandwidth control circuit 94, a stereo separation level control circuit 96, a pilot signal extraction circuit 98, a first adjacent-channel interference noise extraction circuit 100, a comparison circuit 102, a multipath noise extraction circuit 104, a control input generation circuit 106, a multipath reception detection unit 108, a second adjacent-channel interference noise extraction circuit 110, and a modulation level signal generation circuit 112. Also, the FM tuner 50 is connected to a system bus (not shown), and operates under the control of a microcomputer or other control unit (not shown) via the system bus.

The RF signal $S_{RF}$ is input to the FM-RF tuned amplifier circuit 56. The FM-RF tuned amplifier circuit 56 attenuates the components out of the RF signal $S_{RF}$ that fall outside a band corresponding to a carrier wave frequency $f_R$ for the received target FM signal. Accordingly, the RF signal $S_{RF}$ in the band that includes the frequency $f_R$ for the preferred station is passed through the FM-RF tuned amplifier circuit 56, and the signal output from the FM-RF tuned amplifier circuit 56 is input to the first mixing circuit 60.

The first local oscillator unit 58 has a first oscillator circuit 114 and a divider circuit 116. The first oscillator circuit 114 has a PLL circuit that uses an original oscillation signal $S_O$ output by the crystal oscillation circuit 90. The PLL circuit outputs an oscillation signal $S_{OSC1}$ with a frequency $f_{OSC1}$ corresponding to the preferred station. In the first oscillation circuit 114, the $f_{OSC1}$ is controlled by a control unit, and the $f_{OSC1}$ is set to $\alpha \bullet (f_R+f_{IF1})$, where α is the division ratio of the divider 116. As discussed above, the divider 116 divides the $S_{OSC1}$ from the first oscillation circuit 114 by α, generates an $S_{LO1}$, and outputs to the first mixing circuit 60.

The first mixing circuit 60 mixes the input RF signal $S_{RF}$ with the first local oscillation signal $S_{LO1}$ input from the first local oscillation unit 58, and generates a first intermediate signal $S_{IF1}$. The frequency $f_{LO1}$ for the $S_{LO1}$ is adjusted to be convertible to a predetermined first intermediate frequency $f_{IF1}$ by frequency conversion of the signal for the preferred station with a frequency $f_R$ included in the $S_{RF}$ into the $S_{IF1}$ by the first mixing circuit 60. The first intermediate frequency $f_{IF1}$ is set, for example, to 10.7 MHz.

The $S_{IF1}$ is input to the second mixing circuit 70 via the BPF 62, the buffer amp 64, and the BPF 66. For instance, it is possible to configure the BPF 62 and 66 using a ceramic filter.

Responding to the settings of $f_{IF1}$=10.7 MHz and $f_{IF2}$=450 kHz, the second local oscillation unit 68 generates an $S_{LO2}$ with a frequency $f_{LO2}$ of 10.25 MHz. The second local oscillation unit 68 in this embodiment has a divider 118 in order to generate the $S_{LO2}$. The divider 118 divides by 2 the oscillation signal output by the crystal oscillation circuit 90 with a frequency of, for example, 20.5 MHz; generates the $S_{LO2}$, and supplies the signal to the second mixing circuit 70.

The second mixing circuit 70 mixes the first intermediate signal $S_{IF1}$ input from the BPF 66 with the second local oscillation signal $S_{LO2}$ input from the second local oscillation unit 68, and generates a second intermediate signal $S_{IF2}$ with a second intermediate frequency $f_{IF2}$. The frequency $f_{LO2}$ of the $S_{LO2}$ is set to ($f_{IF1}$-$f_{IF2}$), and the target reception signal with a frequency $f_{IF1}$ included in the $S_{IF1}$ is converted into a frequency $f_{IF2}$ in the second mixing circuit 70. The second intermediate frequency $f_{IF2}$ is set, for example, to 450 kHz.

The $S_{IF2}$ is input to the IFBPF 74 via the buffer amp 72. The IFBPF 74 is a bandpass filter that sets $f_{IF2}$ as the center frequency and is capable of variably setting the pass bandwidth $W_F$. The pass bandwidth $W_F$ of the IFBPF 74 is controlled by the bandwidth control circuit 94, as will be discussed hereafter.

The $S_{IF2}$ output from the IFBPF 74 is input to the FM detection circuit 78 via the limiter amp 76. The FM detection circuit 78 is composed of a quadrature detection circuit. The FM detection circuit 78 performs FM detection of the $S_{IF2}$ input from the limiter amp 76, and outputs a detection output signal $S_{DET}$.

The noise canceller 80 removes pulse noise from the detection output signal $S_{DET}$. For instance, in a car FM tuner, the received signal can be overlaid with "pulse noise" with short time duration and high amplitude, caused by the operation of the car engine, electric mirrors, windshield wipers, and the like. The noise canceller 80 reduces sound quality degradation caused by pulse noise. Once the pulse noise has been removed the $S_{DET}$ is input to the matrix circuit 82.

The pilot signal extraction circuit 98 is provided for the output of the noise canceller 80. The $S_{DET}$ is a stereo composite signal made up of an (L+R) signal, an (L−R) signal, and a pilot signal $S_{PL}$. The pilot signal extraction circuit 98 extracts the pilot signal $S_{PL}$ from the $S_{DET}$. The extracted pilot signal $S_{PL}$ is input to the matrix circuit 82.

During stereo broadcast, the matrix circuit 82 uses the pilot signal $S_{PL}$ input from the pilot signal extraction circuit 98 to cancel out the pilot signal $S_{PL}$ from the $S_{DET}$, and it is possible to extract the (L+R) signal and the (L−R) signal, respectively. In addition, it is possible using a matrix scheme to separate the L signal and the R signal for output from the (L+R) signal and the (L−R) signal.

The stereo separation level control circuit 96 adjusts the relative strength of the difference signal (L−R) in relation to the sum signal (L+R) in the matrix process in the matrix circuit 82, and controls the stereo signal separation level.

The S-meter circuit 92 generates a signal $S_{M-AC}$ corresponding to the fluctuation component included in the $S_{IF1}$ on the basis of, e.g., the $S_{IF1}$ input from the BPF 66; smoothes the fluctuation component using the LPF; and generates the reception field strength signal $S_{M-DC}$.

Figure 2:
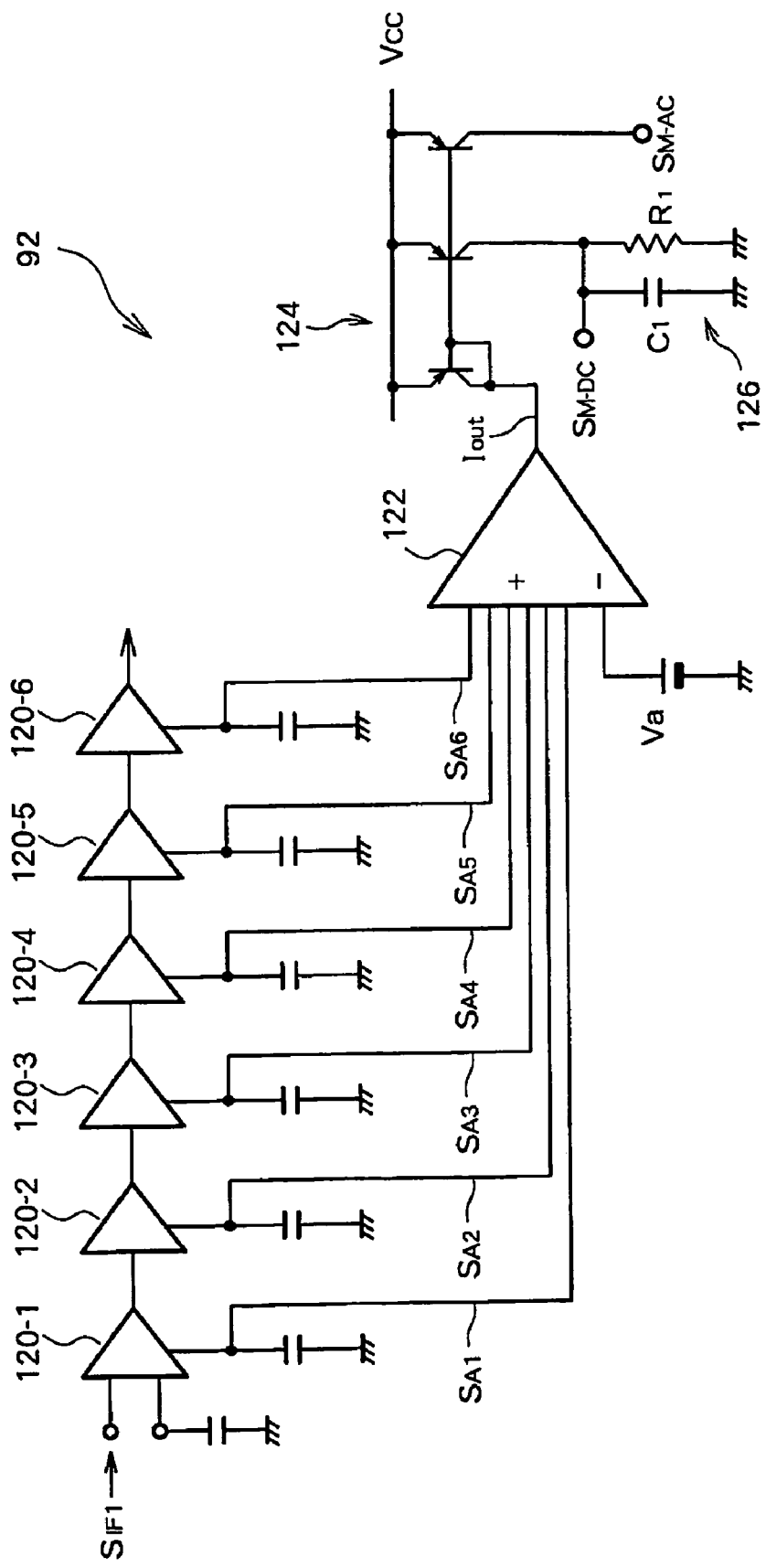
FIG. 2 is a circuit diagram showing the general configuration of the S-meter circuit.
Figure 3:
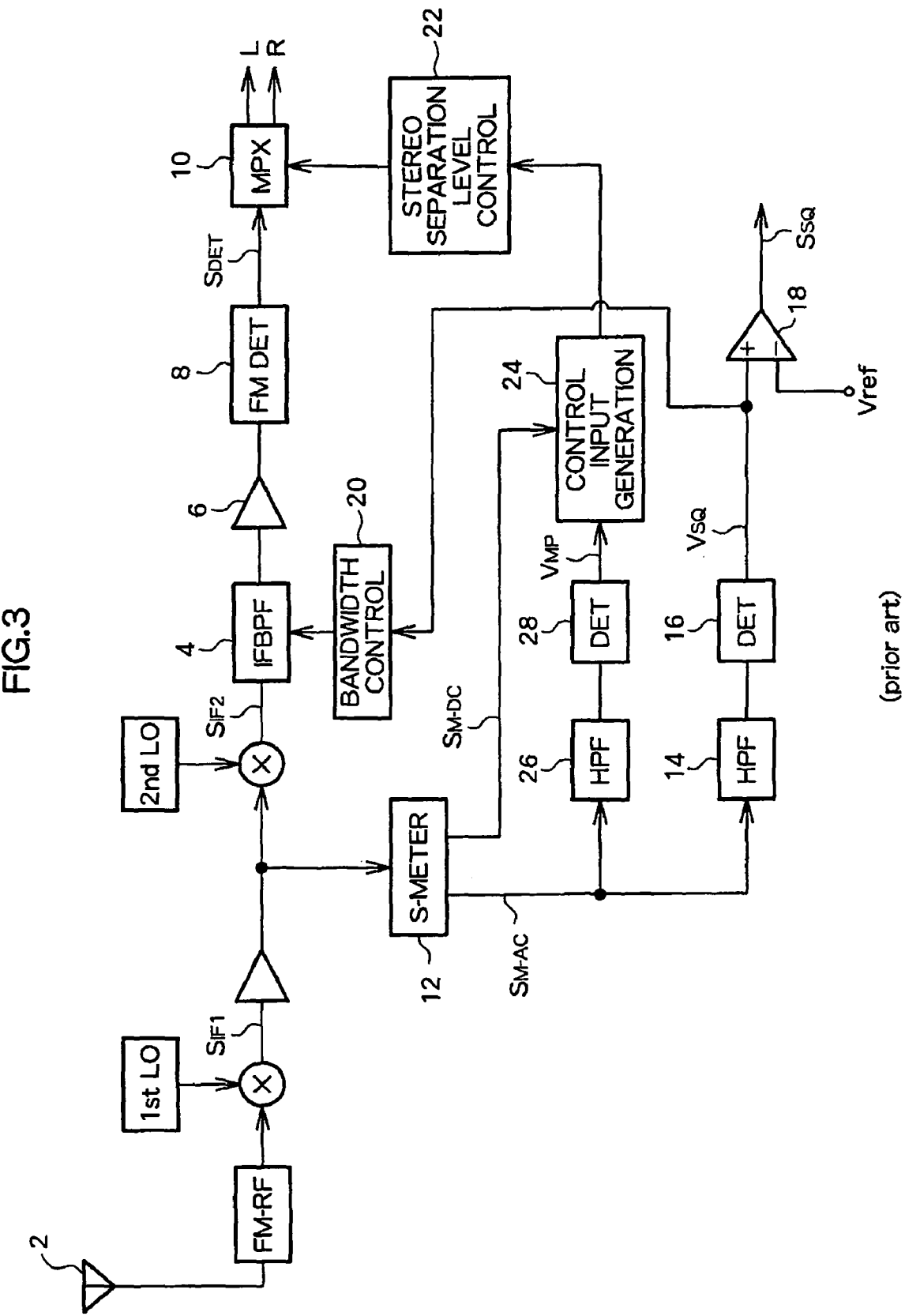
FIG. 3 is a block diagram describing the configuration of a conventional FM tuner.

FIG. 2 is a circuit diagram showing the general configuration of the S-meter circuit 92. The S-meter circuit 92 has six limiter amps 120-1 through 120-6 connected in-line, an accumulator 122 into which the output of the limiter amps 120-1 through 120-6 is input in parallel, a current mirror circuit 124 that extracts an output current $I_{OUT}$ from the accumulator 122 to the respective output circuits for the $S_{M-DC}$ and the $S_{M-AC}$, and a smoothing circuit 126 that generates the $S_{M-DC}$ on the basis of the output current from the current mirror circuit 124.

The $S_{IF1}$ is input to the first limiter amp 120-1, and is amplified by each of the limiter amps 120 one after the other. An output signal $S_{Ak}$ from each limiter amp 120-k (where k is an integer with a value of $1 \leq k \leq 6$) is input to the accumulator 122. The accumulator 122 calculates the voltage differential $\delta V_{Ak}$ between each $S_{Ak}$ and the reference voltage Va (i.e. $\delta V_{Ak} \equiv S_{Ak} - Va$). For a $\delta V_{Ak}$ where $\delta V_{Ak} > 0$, a current $\delta I_{Ak}$ corresponding to the voltage differential is generated, and the resultant current is output as $I_{OUT}$.

The current mirror 124 has an input side channel through which the $I_{OUT}$ flows, and an output side channel provided in 2 parallel lines. The input side $I_{OUT}$ is replicated respectively in each output side channel. The smoothing circuit 126 composed of a resistor $R_1$ and a capacitor $C_1$ is provided on one output side channel. The smoothing circuit 126 has a large time constant, and generates the signal $S_{M-DC}$, which is sufficiently smoothed and treated effectively as DC. The signal corresponding to the $I_{OUT}$ extracted to the other output side channel is output as the $S_{M-AC}$, including a variety of variation components.

The $S_{M-AC}$ is input to the first adjacent-channel interference noise extraction circuit 100 and the multipath noise extraction circuit 104.

The first adjacent-channel interference noise extraction circuit 100 extracts noise components caused by adjacent-channel interference, including $S_{M-AC}$. Adjacent-channel interference occurs in instances in which other stations exist at a frequency close to that of the preferred station, and interferes with favorable reception of the preferred station. If the RF frequency differential between the broadcast station causing adjacent-channel interference and the preferred station is represented as Δf, a high-frequency component having a frequency corresponding to Δf will be present in the $S_{M-AC}$ when adjacent-channel interference occurs. The first adjacent-channel interference noise extraction circuit 100 is composed of an HPF 130 and a detection circuit 132.

A cutoff frequency $f_C$ in the HPF 130 is set to allow the main components of the adjacent-channel interference noise included in the $S_{M-AC}$ to pass through the HPF 130. For example, since the FM broadcast channel step in Japan is 100 kHz, the cutoff frequency $f_C$ of the HPF 130 can be set to around 100 kHz.

The detection circuit 132 performs rectifying detection on the high-frequency component that has passed through the HPF 130 and converts the component to DC voltage. As a result, the first adjacent-channel interference noise extraction circuit 100 generates a DC signal $S_{AI1}$ with a voltage level corresponding to the adjacent-channel interference noise component amount in the received signal. The $S_{AI1}$ is used in the bandwidth control circuit 94 for switching between a wider or narrower pass-through bandwidth $W_F$ for the IFBPF 74, as will be discussed hereafter. In order to diminish the effect on the output audio signal from frequent switching of the $W_F$, the $S_{AI1}$ is smoothed using a predetermined time constant. For instance, a time constant of about 2 mS is applied.

The comparison circuit 102 compares the level of the adjacent-channel interference noise component $S_{AI1}$ extracted by the first adjacent-channel interference noise extraction circuit 100 with a predetermined reference voltage $V_{ref1}$ and determines whether an adjacent-channel interference state exists or not. Specifically, if $S_{AI1} > V_{ref1}$, a predetermined voltage $V_H$ (H level) corresponding to a logical value of "1" is output as the signal $S_{SQ1}$ indicating a determination result that adjacent-channel interference has occurred. However, if $S_{AI1} \leq V_{ref1}$, a predetermined voltage $V_L$ (L level) corresponding to a logical value of "0" is output as the signal $S_{SQ1}$ indicating a determination result that no adjacent-channel interference has occurred. The $S_{SQ1}$ is sent to the microcomputer or other control unit via the system bus, and is used for AF search control.

The multipath noise extraction circuit 104 is composed of an HPF 134 and a detection circuit 136. The cutoff frequency $f_C$ for the HPF 134 is set to allow the main components of the multipath noise included in the $S_{M-AC}$ to pass through the HPF 134. It is possible for $f_C$ to be set to about 50 kHz for FM radio broadcast. The detection circuit 136 performs rectifying detection on the high-frequency component that has passed through the HPF 134 and converts the component to a DC current. As a result, the multipath noise extraction circuit 104 generates a DC signal $S_{MP}$ with a voltage level corresponding to the multipath noise component amount in the received signal. The $S_{MP}$ is input to the control input generation circuit 106. As will be discussed hereafter, the $S_{MP}$ is used for generation of a control input signal $S_{SC}$ to the stereo separation level control circuit 96 and a multipath interference detection signal $S_{SQ2}$.

Another output $S_{M-DC}$ from the S-meter circuit 92 is input to the control input generation circuit 106 and the bandwidth control circuit 94. Further discussion will follow.

The second adjacent-channel interference noise extraction circuit 110 extracts the adjacent-channel interference noise component included in the output signal $S_{DET}$ from the FM detection circuit 78. The $S_{DET}$ when adjacent-channel interference occurs is overlaid with an audio band signal component corresponding to the preferred station, and has a high-frequency component having a frequency corresponding to the RF frequency differential $\Delta f$ between the preferred station and the interfering station. The second adjacent-channel interference noise extraction circuit 110 is composed of an HPF 138 and a detection circuit 140, and outputs a DC signal $S_{AI2}$ with a voltage level corresponding to the strength of the high-frequency component produced by the adjacent-channel interference. For example, the cutoff frequency $f_C$ for the HPF 138 can be set to about 100 kHz, as with the HPF 130. The $S_{AI2}$ is input to the bandwidth control circuit 94.

The modulation level signal generation circuit 112 generates a DC signal $S_{MD}$ with a voltage level corresponding to the modulation level of the received signal on the basis of the $S_{DET}$. The modulation level signal generation circuit 112 is composed of an LPF 142 and a detection circuit 144. The circuit removes the high-frequency component caused by adjacent-channel interference, and the like, and outputs the DC signal $S_{MD}$ with a voltage level corresponding to the modulation level. The $S_{MD}$ is used by the bandwidth control circuit 94.

The bandwidth control circuit 94 controls the bandwidth $W_F$ of the IFBPF 74 on the basis of the $S_{M-DC}$ generated by the S-meter circuit 92, the $S_{AI1}$ generated by the first adjacent-channel interference noise extraction circuit 100, the $S_{AI2}$ generated by the second adjacent-channel interference noise extraction circuit 110, and the $S_{MD}$ from the modulation level signal generation circuit 112. For example, the bandwidth control circuit 94 determines whether or not the adjacent-channel interference strength has exceeded a predetermined threshold value. Below the threshold value, the $W_F$ is set to a wider reference bandwidth so audio distortion will not occur. However, in an instance in which either the $S_{AI1}$ or the $S_{AI2}$, or both, exceed the threshold value, the $W_F$ is narrowed from the reference bandwidth. As a result, it is possible to remove the adjacent-channel interference wave in the IFBPF 74.

Also, the bandwidth control circuit 94 sets the bandwidth $W_F$ narrower in a case in which the received signal strength is in a predetermined weak field state and in a predetermined low modulation level state, on the basis of the $S_{M-DC}$ and the $S_{MD}$, even when the adjacent-channel interference strength is at or below a predetermined threshold value, for example. As a result, treble component noise that increases in a weak field state is removed by the IFBPF 74, and sensitivity is improved. In the case of a high modulation level, audio distortion will readily occur if $W_F$ is narrowed. Therefore, in the case of a high modulation level, the bandwidth control circuit 94 sets the $W_F$ to the reference bandwidth, even in a weak field state, provided that adjacent-channel interference does not occur. However, in a state in which adjacent-channel interference does occur, adjacent-channel interference is prioritized over audio distortion prevention, and $W_F$ is narrowed, even at a high modulation level. Accordingly, the present FM tuner 50 reduces the auditory effect of audio distortion that can occur at this time through control of the separation level $R_{SEP}$, which will be discussed hereafter.

The control input generation circuit 106 generates the control input signal $S_{SC}$ to the stereo separation level control circuit 96 on the basis of the $S_{M-DC}$ corresponding to the reception field strength and the $S_{MP}$ corresponding to the multipath noise component amount. The control input generation circuit 106 attenuates the $S_{M-DC}$ in accordance with the $S_{MP}$ and generates the $S_{SC}$. Also, the control input generation circuit 106 has a function for smoothing the $S_{SC}$ using a predetermined time constant.

The $S_{SC}$ generated by the control input generation circuit 106 will decline to a greater degree, when the electric field strength is weaker, and also when the fluctuation component corresponding to the multipath noise component is larger. In response, the stereo separation level control circuit 96 lowers the separation level using the matrix circuit 82 in a case in which the $S_{SC}$ is low, and raises the level in a case in which the $S_{MP}$ is high. As a result, when the field is weak and when multipath reception occurs, reproduction is performed with a reduced stereo separation level or as monaural reproduction. The effect of noise offensive to the ear at the time of a weak field and of multipath noise on stereo audio is reduced, and auditory irritation is diminished.

In addition, unnecessarily frequent switching between a high stereo separation level state and a monaural reproduction state (or a stereo reproduction state in which the separation level is reduced) is prevented, state switching is performed smoothly, and auditory irritation is reduced.

The multipath reception detection unit 108 determines whether or not a multipath reception state exists in accordance with the level of the multipath noise extracted by the multipath noise extraction circuit 104. In the present embodiment, The multipath reception detection unit 108 has a comparison circuit 146 and a voltage source 148 for supplying a reference voltage $V_{REF2}$. The $V_{REF2}$ is set to a predetermined threshold value. The comparison circuit 146 compares the $S_{MP}$ input from the multipath noise extraction circuit 104 with the $V_{REF2}$, and if $S_{MP} > V_{REF2}$, for example, an H level corresponding to a logical value of "1" is output as the signal $S_{SQ2}$, indicating a determination result that multipath interference has occurred. However, if $S_{MP} \leq V_{REF2}$, an L level corresponding to a logical value of "0" is output as the signal $S_{SQ2}$, indicating a determination result that multipath interference has not occurred. As with the $S_{SQ1}$, the $S_{SQ2}$ is sent to the microcomputer or other control unit via the system bus, and is used for AF search control.

The multipath reception detection unit 108 is input the signal $S_{MP}$ to which the time constant is not applied, not the output signal $S_{SC}$ of the control input generation circuit 106, to which a comparatively large time constant is applied. Accordingly, the multipath reception detection unit 108 is able to rapidly detect and determine whether or not a state change has occurred in the multipath reception state, and the AF search and the like utilizing the result can be accelerated.

In the configuration described above, a configuration is possible, for example, in which the $V_{REF2}$ can be variably set, or the control is performed from the control unit via the system bus.

In addition, the multipath reception detection unit 108 can also be configured with an A/D converter for converting the $S_{MP}$ to a digital value $D_{MP}$, and with a microcomputer for identifying the occurrence of multipath reception on the basis of the digital value $D_{MP}$. The microcomputer can be configured with a control unit connected to the A/D converter via the system bus. The $D_{MP}$ is sent to the control unit via the system bus, and a decision is made via a calculation process in the control unit as to whether or not a correspondence exists with a multipath reception state in which the $D_{MP}$ exceeds a predetermined threshold value.

According to the present invention as described above, adjacent-channel interference detection and multipath reception detection are performed in parallel on the basis of the amplitude fluctuation component $S_{M-AC}$ extracted from the FM reception signal by the S-meter circuit 92. Accordingly, it is possible to accelerate the AF search using both detection results. A portion of the circuitry for determining a multipath reception state has conventionally shared circuitry that extracts the multipath noise component for control input generation of the stereo separation level. This makes it possible to make only a minor enlargement of the FM tuner circuit scale, and minimize any increase in the size and cost of the IC chips that constitute the FM tuner.

According to the present invention, it is possible to configure adjacent-channel interference detection and multipath interference detection using separate circuits; therefore, it is possible to perform detection simultaneously in parallel, and to accelerate the AF search. Here, the FM tuner for controlling the stereo separation level during multipath reception has a multipath noise extraction circuit for extracting the multipath noise component in order to generate a control input signal to the stereo separation level control unit. In the present invention, the multipath noise extraction circuit is used as one part of the circuit configuration for detecting multipath interference. Accordingly, a configuration providing circuitry for detecting multipath interference can be obtained separately from the circuitry for detecting adjacent-channel interference, and with a smaller and simpler circuit configuration.

What is claimed is:

1. An FM tuner comprising:
    a stereo separation level control unit for controlling the stereo separation level of a stereo audio signal detected from an FM received signal;
    a multipath noise component extraction unit for extracting a noise component based on multipath reception from an amplitude fluctuation component present in the FM received signal;
    a control input generation unit for generating a control input signal to the stereo separation level control unit on the basis of the noise component;
    a multipath reception detection unit for detecting the multipath reception on the basis of the level of the noise component; and
    an adjacent-channel interference detection unit for detecting interference from an adjacent signal in relation to a reception target station on the basis of the amplitude fluctuation component, in parallel with detection of the multipath reception by the multipath reception detection unit.

2. An FM tuner according to claim 1, wherein the multipath reception detection unit having:
    a comparator for comparing the level of the noise component with a determination reference voltage and determining the generation of the multipath reception; and
    a reference voltage generation unit capable of variably setting the determination reference voltage.

3. An FM tuner according to claim 1, wherein the multipath reception detection unit having:
    an A/D converter for converting the level of the noise component to digital values; and
    a microcomputer for determining the generation of the multipath reception on the basis of the digital values.

4. An FM tuner according to claim 1, wherein the control input generation unit generates a control input signal that follows variations in the noise component at a predetermined time constant.

* * * * *